(12) United States Patent
Otsuki

(10) Patent No.: US 9,223,304 B2
(45) Date of Patent: Dec. 29, 2015

(54) NUMERICAL CONTROLLER WITH WORKPIECE SETTING ERROR COMPENSATION UNIT FOR MULTI-AXIS MACHINE TOOL

(75) Inventor: Toshiaki Otsuki, Minamitsuru-gun (JP)

(73) Assignee: FANUC Corporation, Minamitsuru-gun, Yamanashi (JP)

( * ) Notice: Subject to any disclaimer, the term of this patent is extended or adjusted under 35 U.S.C. 154(b) by 853 days.

(21) Appl. No.: 13/537,500

(22) Filed: Jun. 29, 2012

(65) Prior Publication Data
US 2013/0060373 A1    Mar. 7, 2013

(30) Foreign Application Priority Data
Sep. 7, 2011    (JP) .................. 2011-195234

(51) Int. Cl.
G05B 19/18    (2006.01)
G05B 19/404    (2006.01)

(52) U.S. Cl.
CPC ................... G05B 19/404 (2013.01)

(58) Field of Classification Search
CPC .................................................. G05B 19/404
See application file for complete search history.

(56) References Cited

U.S. PATENT DOCUMENTS

| 5,178,123 | A | * | 1/1993 | Yeh | A63B 69/406 |
| | | | | | 124/78 |
| 5,239,160 | A | * | 8/1993 | Sakura | B23K 26/0884 |
| | | | | | 219/121.82 |
| 5,305,652 | A | * | 4/1994 | Zimmer | B25J 9/047 |
| | | | | | 74/490.01 |
| 5,678,964 | A | * | 10/1997 | Dashevsky | B23Q 23/00 |
| | | | | | 409/132 |
| 5,758,429 | A | * | 6/1998 | Farzan | G01B 5/008 |
| | | | | | 33/1 MP |
| 6,009,751 | A | * | 1/2000 | Ljung | G01C 19/5719 |
| | | | | | 73/504.02 |
| 8,041,447 | B2 | * | 10/2011 | Otsuki | G05B 19/4086 |
| | | | | | 318/568.15 |
| 8,255,078 | B2 | * | 8/2012 | Otsuki | G05B 19/4103 |
| | | | | | 700/186 |
| 8,260,453 | B2 | * | 9/2012 | Otsuki | G05B 19/404 |
| | | | | | 318/568.15 |
| 9,063,536 | B2 | * | 6/2015 | Otsuki | G05B 19/4086 |
| | | | | | 1/1 |
| 2006/0271241 | A1 | * | 11/2006 | Freeman | B25J 9/1607 |
| | | | | | 700/265 |
| 2009/0093905 | A1 | * | 4/2009 | Otsuki | G05B 19/4086 |
| | | | | | 700/174 |

FOREIGN PATENT DOCUMENTS

| JP | 2007-203380 A | 8/2007 |
| JP | 2009-15464 | 1/2009 |
| JP | 2009-93269 | 4/2009 |
| JP | 2009-301232 A | 12/2009 |
| JP | 2011-133968 | 7/2011 |

* cited by examiner

*Primary Examiner* — Ramesh Patel
(74) *Attorney, Agent, or Firm* — Drinker Biddle & Reath LLP

(57) ABSTRACT

A numerical controller for controlling a multi-axis machine tool for machining with three linear axes and three rotating axes has a function for compensating a setting error that arises when a workpiece is set. This numerical controller determines compensated linear axis positions of the three linear axes and compensated rotating axis positions of the three rotating axes by calculating compensated tool position and direction depending on the setting error such that the tool position and direction on the workpiece setting coordinate system are maintained on the workpiece having such a setting error, and drives and controls the axes according to the compensated linear axis positions and compensated rotating axis positions.

10 Claims, 7 Drawing Sheets

FIG. 1
FIG. 2
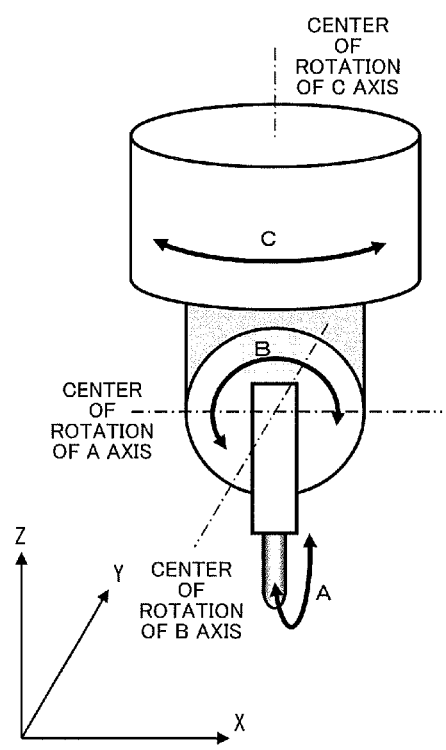
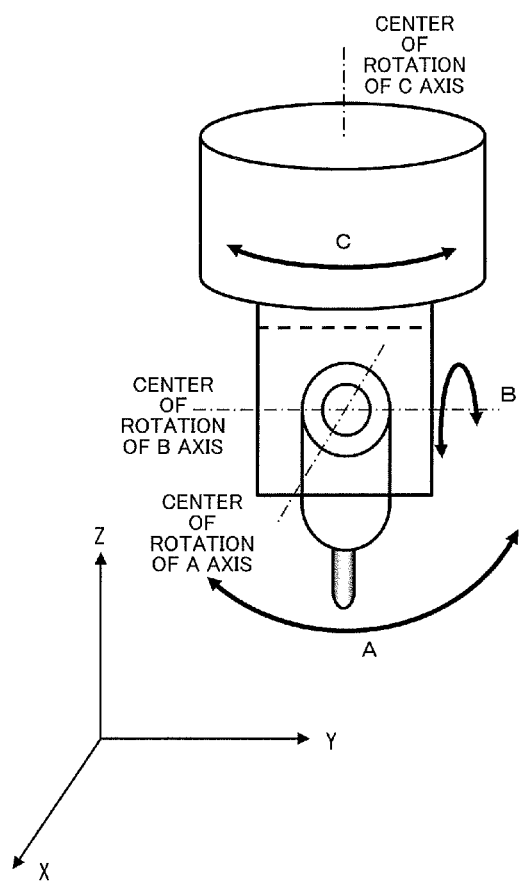

NUMERICAL CONTROLLER WITH WORKPIECE SETTING ERROR COMPENSATION UNIT FOR MULTI-AXIS MACHINE TOOL

RELATED APPLICATION DATA

This application claims priority under 35 U.S.C. §119 and/or §365 to Japanese Application No. 2011-195234 filed Sep. 7, 2011, the entire contents of which are incorporated herein by reference.

BACKGROUND OF THE INVENTION

1. Field of the Invention

The present invention relates to a numerical controller for controlling a multi-axis machine tool (multi-axis processing machine) for machining a workpiece (item to be machined) attached to a table using a mechanism for rotating a table or tool head using at least three linear axes and three rotating axes, and in particular to a numerical controller including a workpiece setting error compensation unit for compensating a setting error that arises when a workpiece is set.

2. Description of the Related Art

Five-axis machine tools having two rotating axes in addition to three linear axes (X, Y, and Z axes) are coming into widespread use. Numerical controllers including a workpiece setting error compensation unit for compensating a workpiece setting error that may arise when a workpiece is set in such a five-axis machine tool are disclosed, for example, in the following three patent references.

Japanese Patent Application Laid-Open No. 2009-15464 discloses a technique for compensating a workpiece setting error that arises when a workpiece is set in a five-axis machine tool by converting an interpolated position on a machine coordinate system into a position on an intermediate coordinate system and converting the position on the intermediate coordinate system into a position on the machine coordinate system. This technique is, however, inapplicable to a numerical controller because this patent reference does not describe which solution should be selected out of a plurality of solutions for rotating axis positions.

U.S. Pat. No. 8,041,447 discloses a technique for calculating tool position and direction on a command coordinate system in a five-axis machine tool and selecting a solution giving a position closer to the commanded position if there are a plurality of solutions when rotating axis positions are calculated after a workpiece setting error is compensated.

Japanese Patent Application Laid-Open No. 2011-133968 discusses a problem with the above-mentioned U.S. Pat. No. 8,041,447 in that rotating axes may largely move near singular points. Large motions of rotating axes near singular points would result in disadvantages such as an increased machining time and a degraded machined surface such as an uneven and/or streaked machined surface. Japanese Patent Application Laid-Open No. 2011-133968 describes, therefore, a technique for causing rotating axes to pass through singular points when the rotating axes are commanded to move over the singular points to the opposite side. This technique, however, causes a machining error because of a changed tool path. These techniques are all directed to five-axis machine tools as describe above.

Recently, tool heads equipped with three rotating axes as shown in FIGS. 1 and 2 are coming into use for head rotation type multi-axis machine tools. Mixed type multi-axis machine tools having two rotating axes for rotating the table and one rotating axis for rotating the head (see FIG. 3) and mixed type multi-axis machine tools having one rotating axis for rotating the table and two rotating axes for rotating the head (see FIG. 4) are also coming into use. Furthermore, a table rotation type multi-axis machine tool having three rotating axes for rotating the table is contemplated as a machine configuration (see FIG. 5). The conventional techniques relate to a five-axis machine tool having three linear axes (X, Y, and Z axes) and two rotating axes as described above and there has been no technique for a numerical controller to compensate a workpiece setting error when a workpiece is set in a multi-axis machine tool having three rotating axes.

Although the aforementioned U.S. Pat. No. 8,041,447 refers to selecting one of a plurality of solutions that exist, but either one of the two solution sets is merely selected. As described later, in a multi-axis machine tool having three rotating axes, there are innumerable solutions when positions of the three rotating axes are calculated. The conventional techniques relating to the above five-axis machine tools are, therefore, difficult to apply to a multi-axis machine tool having three rotating axes.

Furthermore, five-axis machine tools have problems including large motions of rotating axes near singular points and machining errors as described above.

SUMMARY OF THE INVENTION

An object of the present invention is to provide a numerical controller for controlling a multi-axis machine tool having a mechanism for rotating a table or tool head using at least three linear axes and three rotating axes for machining the workpiece attached to the table, the numerical controller including a workpiece setting error compensation unit for compensating a setting error that arises when a workpiece is set. Furthermore, when a workpiece setting error is compensated in a multi-axis machine tool having at least three linear axes and three rotating axes, the numerical controller according to the present invention can avoid large motions that occur near singular points in five-axis machine tools. Consequently, the numerical controller enables machining with higher quality and accuracy in a shorter time.

The numerical controller according to the present invention controls a multi-axis machine tool for machining a workpiece attached to the table using at least three linear axes and three rotating axes. This numerical controller includes a workpiece setting error compensation unit for compensating a setting error that arises when the workpiece is set. The workpiece setting error compensation unit has: a tool position/direction calculation unit for calculating the tool position and direction on a workpiece setting coordinate system on the basis of commanded positions of the three linear axes and three rotating axes, wherein the workpiece setting coordinate system is the coordinate system on which the workpiece is set; a compensated tool position/direction calculation unit for calculating compensated tool position and direction on the basis of the setting error amounts that are set in advance depending on the setting error, such that tool position and direction on the workpiece setting coordinate system calculated by the tool position/direction calculation unit are maintained on the workpiece having the setting error; and a compensated linear/rotating axis position calculation unit for calculating compensated linear axis positions of the three linear axes and compensated rotating axis positions of the three rotating axes from the compensated tool position and direction calculated by the compensated tool position/direction calculation unit. The three linear axes and three rotating axes are driven on the basis of the compensated linear axis positions of the three linear axes and compensated rotating axis positions of the three rotating axes calculated by the compensated linear/rotating axis position calculation unit.

The compensated linear/rotating axis position calculation unit may determine the compensated rotating axis positions by calculating multiple solutions for the three rotating axes from the compensated tool direction calculated by the compensated tool position/direction calculation unit and synthesizing the calculated multiple solutions.

The compensated linear/rotating axis position calculation unit may determine the compensated linear axis positions by multiplying the compensated tool position calculated by the compensated tool position/direction calculation unit by an inverse transformation matrix with the compensated table rotating axis positions out of the compensated rotating axis positions.

The multiple solutions may include a first rotating axis-fixed solution assuming that, of the three rotating axes, a first rotating axis does not move, a second rotating axis-fixed solution assuming that a second rotating axis does not move, and a third rotating axis-fixed solution assuming that a third rotating axis does not move.

The multiple solutions may include a first rotating axis-fixed solution assuming that, of the three rotating axes, the first rotating axis moves through a first rotating axis motion amount determined in the previous interpolation period, a second rotating axis-fixed solution assuming that the second rotating axis moves through a second rotating axis motion amount determined in the previous interpolation period, and a third rotating axis-fixed solution assuming that the third rotating axis moves through a third rotating axis motion amount determined in the previous interpolation period.

The compensated linear/rotating axis position calculation unit may determine the compensated rotating axis positions by calculating evaluation values for highly evaluating a solution giving a smaller motion amount among the multiple solutions and multiplying the motion amounts given by the multiple solutions by the calculated evaluation values and synthesizing the multiplied motion amounts.

The compensated linear/rotating axis position calculation unit may determine the compensated rotating axis positions by determining a verified tool direction from the compensated rotating axis positions of the three rotating axes determined by the compensated linear/rotating axis position calculation unit, verifying whether the difference between the determined verified tool direction and the compensated tool position calculated by the compensated tool position/direction calculation unit is within a preset tolerance, and, if not within the tolerance, determining an evaluation value for highly evaluating a smaller motion amount to repeat the compensated rotating axis position calculation.

According to the present invention, it is possible to provide a numerical controller that enables a multi-axis machine tool having at least three linear axes and three rotating axes to achieve correct and accurate machining as commanded even if a workpiece setting error arises when the workpiece is set.

Furthermore, according to the present invention, in a multi-axis machine tool having three rotating axes, it is possible to select an appropriate solution that does not cause large motions near singular points by making use of the redundancy of one rotating axis out of innumerable solutions to compensate a workpiece setting error that arises when the workpiece is set. Consequently, it is possible to provide a numerical controller that enables machining with higher quality and accuracy in a shorter time without machining error by preventing large motions of rotating axes near singular points.

In this way, according to the present invention, it is possible to provide a numerical controller for controlling a multi-axis machine tool having at least three linear axes and three rotating axes, the numerical controller including a workpiece setting error compensation unit for enabling machining without machining error by compensating a setting error that arises when a workpiece is set and by preventing large motions of rotating axes near singular points.

BRIEF DESCRIPTION OF THE DRAWINGS

The above and other objects and features of the present invention will become apparent from the following description of embodiments with reference to the appended drawings, in which:

FIG. 1 is a schematic view of a tool head for a head rotation type multi-axis machine tool having three rotating axes, viewed from the B-axis direction;

FIG. 2 is a schematic view of a tool head for a head rotation type multi-axis machine tool having three rotating axes, viewed from the A-axis direction;

DETAILED DESCRIPTION OF THE PREFERRED EMBODIMENTS

First Embodiment

Figure 6:
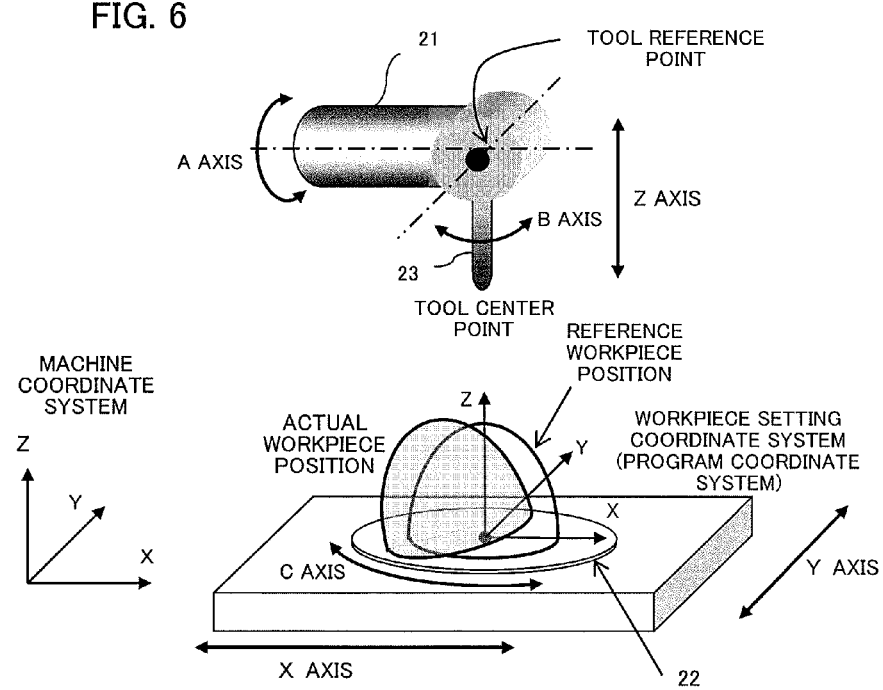
FIG. 6 is a schematic view illustrating workpiece setting error compensation in a mixed type multi-axis machine tool having one rotating axis for rotating the table and two rotating axes for rotating the head.

Referring now to FIG. 6, workpiece setting error compensation in a mixed type multi-axis machine tool having one rotating axis for rotating the table and two rotating axes for rotating the head will be described.

This multi-axis machine tool is configured with, in addition to three linear axes X, Y, and Z, a B axis rotating around the Y axis and an A axis rotating around the X axis for rotating a tool head 21 and a C axis rotating around the Z axis for rotating a rotary table 22. In FIG. 6, reference numeral 23 denotes a tool.

Figure 7:
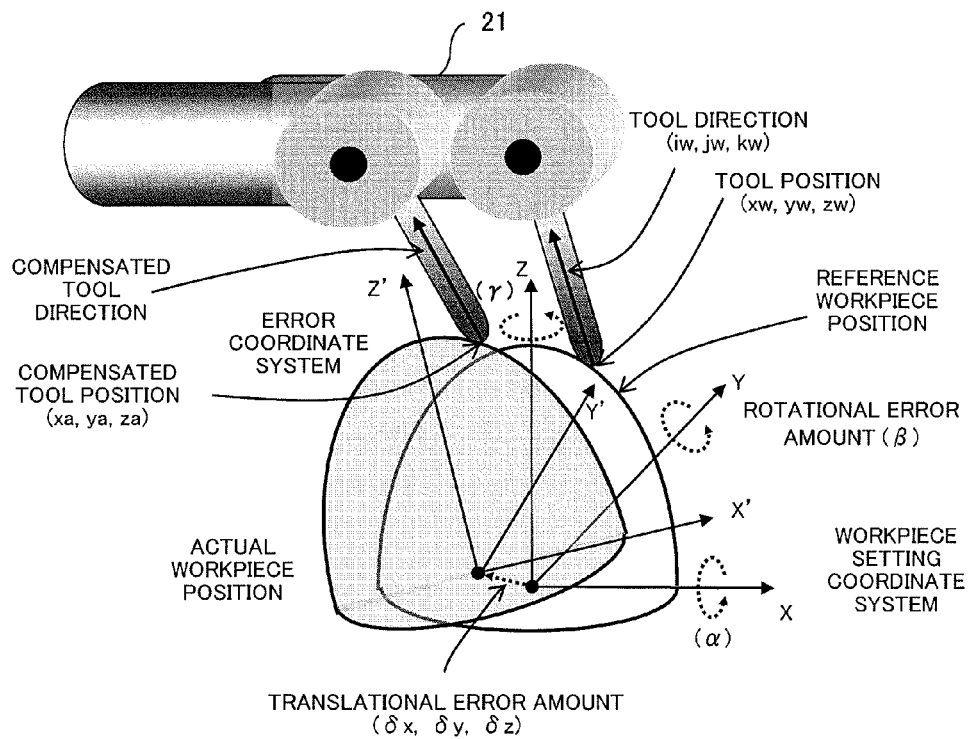
FIG. 7 shows only the workpiece and tool head in FIG. 6.

The actual workpiece position is deviated from the reference workpiece position due to inclination of the table or the workpiece that is deviated when the workpiece is set. The amounts of deviation are measured in advance and set, with respect to the workpiece setting coordinate system, as translational error amounts (δx, δy, δz) along the X, Y, and Z axes, a rotational error amount (α) around the X axis, a rotational error amount (β) around the Y axis, and a rotational error amount (γ) around the Z axis. These translational error amounts (δx, δy, δz) and rotational error amounts (α, β, γ) constitute the setting error amounts. An error coordinate system is created with respect to the workpiece setting coordinate system according to these setting error amounts such that the actual workpiece position on the error coordinate system becomes identical to the reference workpiece position on the workpiece setting coordinate system (see FIG. 7). FIG. 7 shows only the workpiece and tool head in FIG. 6.

The commanded positions (Xc, Yc, Zc, Ac, Bc, Cc) of the three linear axes and three rotating axes are given using the machine coordinate system. The commanded positions (Xc, Yc, Zc) of the three linear axes may indicate a position of the tool center point or a tool reference point distanced from the tool center point toward the tool head by a tool length compensation amount. In FIG. 6, the tool reference point is set at the intersection of the center of rotation of the A axis with the center of rotation of the B axis. Here, the commanded positions (Xc, Yc, Zc) of the three linear axes indicate the tool center point position.

The workpiece setting coordinate system is also a program coordinate system having the origin at the center of rotation of the C axis. Program commands are given using the program coordinate system, indicating interpolated positions on the machine coordinate system that are interpolated in every interpolation period as the commanded positions (Xc, Yc, Zc, Ac, Bc, Cc) of the three linear axes and three rotating axes. Other positions commanded on the program coordinate system by program commands may be given as the commanded positions.

The workpiece setting error compensation for the three linear axes and three rotating axes is performed as follows using the preset values of the translational error amounts (δx, δy, δz) along the X, Y, and Z axes, a rotational error amount (α) around the X axis, a rotational error amount (β) around the Y axis, and a rotational error amount (γ) around the Z axis, such that the tool position and direction based on the commanded positions are kept on the error coordinate system, in other words, such that the tool position and direction on the error coordinate system become identical to the tool position and direction based on the commanded positions on the workpiece setting coordinate system. It should be noted that the above-mentioned tool position and direction on the error coordinate system are the compensated tool position and direction described later when viewed on the workpiece setting coordinate system, which are also shown in FIG. 7 as the compensated tool position and direction.

FIG. 6 shows the position when A=0, B=0, and C=0. The tool direction when A=0, B=0, and C=0 is assumed to be along the Z axis, i.e., vector $(0, 0, 1)^T$. First, the tool position and direction on the workpiece setting coordinate system are calculated on the basis of the commanded positions. 'T' that indicates transposition here will be omitted hereinafter when it is self-evident. Parentheses "( )" in the notation of trigonometric functions as in "sin(Ac)" will be omitted as "sin Ac" when it is self-evident.

The tool direction (iw, jw, kw) on the workpiece setting coordinate system when A=Ac, B=Bc, and C=Cc is calculated as in the following equation (1), while the tool position (xw, yw, zw) is calculated as in the following equation (2). (x0, y0, z0) in equation (2) is the position of the origin of the workpiece setting coordinate system on the machine coordinate system. Here, the matrix calculation for the vector (0, 0, 1) in equation (1) is performed in the order of the rotating axes from the tool to the workpiece. The matrix calculation in equation (2) is a matrix calculation for normal conversion of the rotation amount of a table rotating axis (here, C axis). If another one or more table rotating axes exist as in FIGS. 3 and 5, one or more similar matrix calculations for normal conversion will be added as described later. The calculations in equations (1) and (2), therefore, depend on the machine configuration. These are the calculations performed in the tool position/direction calculation unit:

$$\begin{bmatrix} iw \\ jw \\ kw \end{bmatrix} = \begin{bmatrix} \cos Cc & -\sin Cc & 0 \\ \sin Cc & \cos Cc & 0 \\ 0 & 0 & 1 \end{bmatrix} \begin{bmatrix} 1 & 0 & 0 \\ 0 & \cos Ac & -\sin Ac \\ 0 & \sin Ac & \cos Ac \end{bmatrix} \begin{bmatrix} \cos Bc & 0 & \sin Bc \\ 0 & 1 & 0 \\ -\sin Bc & 0 & \cos Bc \end{bmatrix} \begin{bmatrix} 0 \\ 0 \\ 1 \end{bmatrix} \quad (1)$$

$$= \begin{bmatrix} \cos Cc \sin Bc + \sin Cc \sin Ac \cos Bc \\ \sin Cc \sin Bc - \cos Cc \sin Ac \cos Bc \\ \cos Ac \cos Bc \end{bmatrix}$$

$$\begin{bmatrix} xw \\ yw \\ zw \end{bmatrix} = \begin{bmatrix} \cos Cc & -\sin Cc & 0 \\ \sin Cc & \cos Cc & 0 \\ 0 & 0 & 1 \end{bmatrix} \begin{bmatrix} Xc - x0 \\ Yc - y0 \\ Zc - z0 \end{bmatrix} \quad (2)$$

Next, errors from the tool position (xw, yw, zw) and tool direction (iw, jw, kw) on the workpiece setting coordinate system are compensated as follows.

A compensated tool position (xa, ya, za) is calculated by equation (3) below using the rotational errors (α, β, γ) and translational errors (δx, δy, δz) from the tool position (xw, yw, zw). The rotational errors are compensated in the order of (α), (β), and (γ).

$$\begin{bmatrix} xa \\ ya \\ za \end{bmatrix} = \begin{bmatrix} \cos \gamma & -\sin \gamma & 0 \\ \sin \gamma & \cos \gamma & 0 \\ 0 & 0 & 1 \end{bmatrix} \begin{bmatrix} \cos \beta & 0 & \sin \beta \\ 0 & 1 & 0 \\ -\sin \beta & 0 & \cos \beta \end{bmatrix} \begin{bmatrix} 1 & 0 & 0 \\ 0 & \cos \alpha & -\sin \alpha \\ 0 & \sin \alpha & \cos \alpha \end{bmatrix} \quad (3)$$

$$\begin{bmatrix} xw \\ yw \\ zw \end{bmatrix} + \begin{bmatrix} \delta x \\ \delta y \\ \delta z \end{bmatrix}$$

Here, the commanded positions (Xc, Yc, Zc) of the three linear axes indicate the position of the tool center point. If the commanded positions (Xc, Yc, Zc) indicate the position of the tool reference point, instead of the tool center point, the matrix calculation in equation (3) may be performed, not on (xw, yw, zw), but on a vector of (xw, yw, zw) minus the tool length compensation vector and then the tool length compensation vector amount may be added. If there is a tool head rotating axis as in the embodiments described later, the tool length compensation vector to be added is a tool length compensation vector that has been compensated with the compensated tool direction described below.

The compensated tool direction (ia, ja, ka) is calculated from the tool direction (iw, jw, kw) by equation (4) below using the rotational error amount ($\alpha$) around the X axis, rotational error amount ($\beta$) around the Y axis, and rotational error amount ($\gamma$) around the Z axis. These are the calculations performed in the compensated tool position/direction calculation unit.

$$\begin{bmatrix} ia \\ ja \\ ka \end{bmatrix} = \begin{bmatrix} \cos\gamma & -\sin\gamma & 0 \\ \sin\gamma & \cos\gamma & 0 \\ 0 & 0 & 1 \end{bmatrix} \begin{bmatrix} \cos\beta & 0 & \sin\beta \\ 0 & 1 & 0 \\ -\sin\beta & 0 & \cos\beta \end{bmatrix} \quad (4)$$

$$\begin{bmatrix} 1 & 0 & 0 \\ 0 & \cos\alpha & -\sin\alpha \\ 0 & \sin\alpha & \cos\alpha \end{bmatrix} \begin{bmatrix} iw \\ jw \\ kw \end{bmatrix}$$

Next, the positions of the rotating axes for the compensated tool direction (ia, ja, ka) are determined. The relational expression in equation (5) below is established, as in equation (1) above, for the positions (a, b, c) of the A, B, and C rotating axes for the compensated tool direction (ia, ja, ka).

$$\begin{bmatrix} ia \\ ja \\ ka \end{bmatrix} = \begin{bmatrix} \cos c & -\sin c & 0 \\ \sin c & \cos c & 0 \\ 0 & 0 & 1 \end{bmatrix} \begin{bmatrix} 1 & 0 & 0 \\ 0 & \cos a & -\sin a \\ 0 & \sin a & \cos a \end{bmatrix} \begin{bmatrix} \cos b & 0 & \sin b \\ 0 & 1 & 0 \\ -\sin b & 0 & \cos b \end{bmatrix} \begin{bmatrix} 0 \\ 0 \\ 1 \end{bmatrix} \quad (5)$$

$$= \begin{bmatrix} \cos c \sin b + \sin c \sin a \cos b \\ \sin c \sin b - \cos c \sin a \cos b \\ \cos a \cos b \end{bmatrix}$$

Innumerable solutions exist, however, for the positions (a, b, c) satisfying equation (5) above and the positions (a, b, c) cannot be determined uniquely in an analytical manner. Therefore, an A axis-fixed solution (first rotating axis-fixed solution) with the A axis position fixed, a B axis-fixed solution (second rotating axis-fixed solution) with the B axis position fixed, and a C axis-fixed solution (third rotating axis-fixed solution) with the C axis position fixed are determined. To fix the position of each axis, the axis positions determined in the previous interpolation period may be adopted, or the axis positions assuming that the axis motion amounts in the current interpolation period are identical to the axis motion amounts in the previous interpolation period may be adopted.

<A Axis-Fixed Solution (First Rotating Axis-Fixed Solution)>

Suppose that the A axis position determined after the workpiece setting error is compensated in the previous interpolation period is 'a' of the equation (5). Alternatively, suppose that the A axis motion amount is 'a1' assuming that the A axis motion amount in the current interpolation period is identical to the A axis motion amount after the workpiece setting error is compensated in the previous interpolation period and this A axis motion amount is fixed. More specifically, the above-mentioned A axis position 'a' is fixed by establishing the relation "a1=a0" or "a1=a0+$\Delta$a0" assuming that the A axis position determined after the workpiece setting error is compensated in the previous interpolation period is 'a0' and that the A axis motion amount after the workpiece setting error is compensated in the previous interpolation period is '$\Delta$a0'. Here, the position 'a0' and motion amount (speed) '$\Delta$a0' in the previous period are used; acceleration (difference in speed), jerk (difference in acceleration), etc., may also be used.

Supposing that 'b' and 'c' in the first rotating axis-fixed solution are 'b1' and 'c1', these can be calculated as in equation (6) below from 'a1', 'ia', 'ja', and 'ka' by solving equation (5) above. Here, n is an integer.

$$b1 = \cos^{-1}\left(\frac{ka}{\cos a1}\right) \quad (6)$$

$$c1 = \sin^{-1}\left(\frac{\sin b1}{\sqrt{ia^2 + ja^2}}\right) - \tan^{-1}\left(\frac{ia}{ja}\right) + n*2\pi$$

Here, for solution selection for selecting a function value out of a plurality of function values of $\cos^{-1}$, $\sin^{-1}$ and $\tan^{-1}$ between 0-2 $\pi$ and for the determination of an integer 'n', solutions should be selected such that 'b1' and 'c1' become close to the B and C axis positions after the workpiece setting error is compensated in the previous interpolation period, or such that the solutions give values close to the B and C axis positions in the A axis-fixed solution in the previous interpolation period. In calculation of 'b1', if the denominator and numerator between parentheses '( )' following $\cos^{-1}$ are both zero, 'b1' will become indefinite; if the absolute value between parentheses '( )' following $\cos^{-1}$ is greater than 1, no solution will result. In this case, 'b1' is the B axis position after the workpiece setting error is compensated in the previous interpolation period, or the evaluation value for the first rotating axis-fixed solution described later is set to zero. The same applies to the calculation of 'c1'.

Such processing with the axis position fixed, solution selection, integer value determination, and processing for indefinite and no-solution cases also apply to the calculations for the second and third rotating axis-fixed solutions.

<B Axis-Fixed Solution (Second Rotating Axis-Fixed Solution)>

Suppose that the B axis position determined after the workpiece setting error is compensated in the previous interpolation period is 'b' of the equation (5). Alternatively, suppose that the B axis motion amount is 'b2' assuming that the B axis motion amount in the current interpolation period is identical to the B axis motion amount after the workpiece setting error is compensated in the previous interpolation period and this B axis motion amount is fixed.

When 'a' and 'c' in the second rotating axis-fixed solution are supposed to be 'a2' and 'c2', these can be calculated as in equation (7) below from 'b2', 'ia', 'ja', and 'ka' by solving equation (5) above. Here, m is an integer.

$$a2 = \cos^{-1}\left(\frac{ka}{\cos b2}\right) \quad (7)$$

$$c2 = \sin^{-1}\left(\frac{\sin b2}{\sqrt{ia^2 + ja^2}}\right) - \tan^{-1}\left(\frac{ia}{ja}\right) + m*2\pi$$

<C Axis-Fixed Solution (Third Rotating Axis-Fixed Solution)>

Suppose that the C axis position determined after the workpiece setting error is compensated in the previous interpolation period is 'c' of the equation (5). Alternatively, suppose that the C axis motion amount is 'c3' assuming that the C axis motion amount in the current interpolation period is identical to the C axis motion amount after the workpiece setting error is compensated in the previous interpolation period and this C axis motion amount is fixed.

When 'a' and 'b' in the third rotating axis-fixed solution are supposed to be 'a3' and 'b3', these can be calculated as in equation (8) below from 'c3', 'ia', 'ja', and 'ka' by solving equation (5) above.

$$b3 = \sin^{-1}(ia \cos c3 + ja \sin c3) \quad (8)$$

$$a3 = \cos^{-1}\left(\frac{ka}{\cos b3}\right)$$

Figure 8:
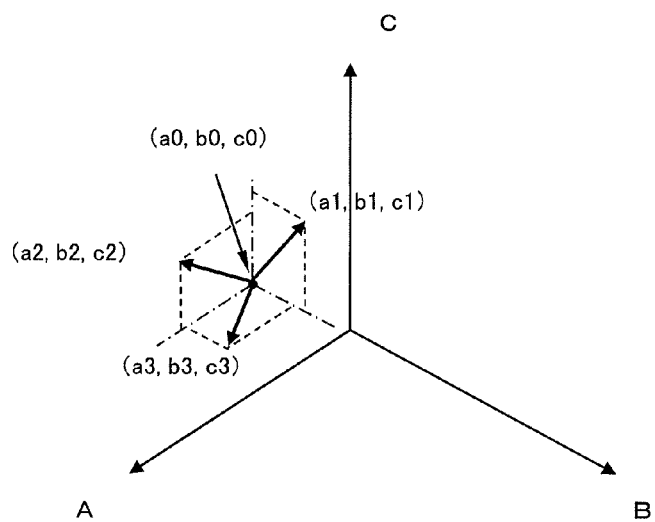
FIG. 8 illustrates rotating axis-fixed solutions that are calculated assuming that the positions at which the A, B, and C axes are fixed are the A, B, and C axis positions (a0, b0, c0) determined in the previous interpolation period, on a coordinate system using the A, B, and C axes as coordinate axes.

FIG. 8 illustrates, in a coordinate system using the A, B, and C axes as coordinate axes, the rotating axis-fixed solutions that are calculated assuming that the positions at which the A, B, and C axes are fixed are the A, B, and C axis positions (a0, b0, c0) determined in the previous interpolation period.

Next, temporary evaluation values V1', V2', and V3' are determined for the first, second, and third rotating axis-fixed solutions, respectively. Here, the first, second, and third rotating axis-fixed solutions constitute the multiple solutions. These temporary evaluation values highly evaluate a smaller synthesized motion amount of the axes (A, B, and C axes) determined by each of the multiple solutions. Suppose that the values calculated in equation (9) below, for example, are the temporary evaluation values. Here, 'a0', 'b0', and 'c0' are the A, B, and C axis positions in the previous interpolation period and the denominator in each equation (9) is the synthesized motion amount of the axes given by each solution. 'w' is an exponent value indicating how much a smaller motion amount is evaluated. In this manner, the motion amounts of the rotating axes caused by compensating the workpiece setting error can be minimized by highly evaluating a smaller synthesized motion amount of the axes (A, B, and C axes) given by each of the multiple solutions and by multiplying the motion amount given by each solution by the evaluation value and synthesizing the resultant motion amounts as described below. Thus, large motions of the rotating axes near singular points can be avoided.

$$V1' = \left(\frac{1}{\sqrt{(a1-a0)^2 + (b1-b0)^2 + (c1-c0)^2}}\right)^w \quad (9)$$

$$V2' = \left(\frac{1}{\sqrt{(a2-a0)^2 + (b2-b0)^2 + (c2-c0)^2}}\right)^w$$

$$V3' = \left(\frac{1}{\sqrt{(a3-a0)^2 + (b3-b0)^2 + (c3-c0)^2}}\right)^w$$

These temporary evaluation values are exemplary values; other equations may be used provided that they use evaluation values highly evaluating a smaller synthesized motion amount of the axes (A, B, and C axes) given by each solution. For example, in the calculation of V1', a constant BV1 may be added as shown in equation (10) below, or the denominator may be an absolute value of each motion amount, or the numerator may be a constant value NV1. The same applies to V2' and V3'.

$$V1' = BV1 + \left(\frac{1}{|a1-a0|+|b1-b0|+|c1-c0|}\right)^w \quad (10)$$

The temporary evaluation values V1', V2', and V3' are normalized to evaluation values V1, V2, and V3. Alternatively, the evaluation value for the solution that gives the smallest synthesized motion amount of the axes (A, B, and C axes) determined by each of the multiple solutions may be set to 1 and the evaluation values for the other solutions may be set to 0. Accordingly, the term "synthesize" includes the selection of one of the multiple solutions, and "synthesize" is performed as described below. Then, the motion amounts given by the first, second, and third rotating axis-fixed solutions are multiplied by the evaluation values and synthesized as in equation (11) below.

$$a = a0 + V1(a1-a0) + V2(a2-a0) + V3(a3-a0)$$

$$b = b0 + V1(b1-b0) + V2(b2-b0) + V3(b3-b0)$$

$$c = c0 + V1(c1-c0) + V2(c2-c0) + V3(c3-c0) \quad (11)$$

With this, the rotating axis positions (a, b, c) to which the A, B, and C axes are to be moved in the current interpolation period are determined. Although the first, second, and third rotating axis-fixed solutions are the solutions to equation (5) above, 'a', 'b', and 'c' determined by equation (11) above are not exactly the solutions to equation (5). Therefore, 'a', 'b', and 'c' are verified by substituting 'a', 'b', and 'c' into the right side of equation (5) to determine verified tool directions (iv, jv, kv). First, suppose that the left side of equation (5) determined by substituting 'a', 'b', and 'c' determined by equation (11) into the right side of equation (5) is (iv, jv, kv). Then, D is determined by equation (12) below from (iv, jv, kv) and (ia, ja, ka) determined by equation (4), and the determined D is compared with a preset tolerance D0; if D is smaller than tolerance D0, 'a', 'b', and 'c' are the positions to which the A, B, and C axes are to be moved in the current interpolation period. If D is greater than tolerance D0, evaluation values are determined again by equation (9) or (10) with a greater 'w', and calculations by equations (11) and (12) are repeated until D becomes smaller than tolerance D0. To increase 'w', a constant value 'dw' may be added to 'w', i.e., w=w+dw, or 'w' may be multiplied with a coefficient 'kw' greater than 1, i.e., w=kw×w, for example.

$$D = \sqrt{(ia-iv)^2 + (ja-jv)^2 + (ka-kv)^2} \quad (12)$$

Ultimately determined (a, b, c) are compensated rotating axis positions.

Next, compensated linear axis positions (x, y, z) are calculated by equation (13) below from the compensated tool position (xa, ya, za). Here, the matrix calculation with 'c' is a multiplication of the inverse transformation matrix with the position of a table rotating axis (here, C axis) out of the (a, b, determined as the compensated rotating axis positions. If another one or more table rotating axes exist as in FIGS. 3 and 5, corresponding inverse transformation matrix multiplications are added as described later.

$$\begin{bmatrix} x \\ y \\ z \end{bmatrix} = \begin{bmatrix} \cos c & \sin c & 0 \\ -\sin c & \cos c & 0 \\ 0 & 0 & 1 \end{bmatrix} \begin{bmatrix} xa \\ ya \\ za \end{bmatrix} + \begin{bmatrix} x0 \\ y0 \\ z0 \end{bmatrix} \quad (13)$$

Accordingly, the calculations by equations (5) to (13) above are the calculations performed in the compensated linear/rotating axis position calculation unit.

Second Embodiment

Described below is workpiece setting error compensation in a tool head rotation type multi-axis machine tool having three rotating axes for rotating the tool head (see FIGS. 1 and 2).

Since the rotating axes are arranged in the order of A, B, and C axes from the tool to the workpiece, equation (14) below is used instead of equation (1) above (furthermore, instead of equation (5) above). In addition, since there is no table rotating axis, equation (15) below is used instead of equation (2) above, and equation (16) below is used instead of equation (13) above.

$$\begin{bmatrix} iw \\ jw \\ kw \end{bmatrix} = \begin{bmatrix} \cos Cc & -\sin Cc & 0 \\ \sin Cc & \cos Cc & 0 \\ 0 & 0 & 1 \end{bmatrix} \begin{bmatrix} \cos Bc & 0 & \sin Bc \\ 0 & 1 & 0 \\ -\sin Bc & 0 & \cos Bc \end{bmatrix} \quad (14)$$

$$\begin{bmatrix} 1 & 0 & 0 \\ 0 & \cos Ac & -\sin Ac \\ 0 & \sin Ac & \cos Ac \end{bmatrix} \begin{bmatrix} 0 \\ 0 \\ 1 \end{bmatrix}$$

$$\begin{bmatrix} xw \\ yw \\ zw \end{bmatrix} = \begin{bmatrix} Xc \\ Yc \\ Zc \end{bmatrix} - \begin{bmatrix} x0 \\ y0 \\ z0 \end{bmatrix} \quad (15)$$

$$\begin{bmatrix} x \\ y \\ z \end{bmatrix} = \begin{bmatrix} xa \\ ya \\ za \end{bmatrix} + \begin{bmatrix} x0 \\ y0 \\ z0 \end{bmatrix} \quad (16)$$

The subsequent calculations are the same as in the above first embodiment and therefore description thereof will be omitted.

Third Embodiment

Figure 3:
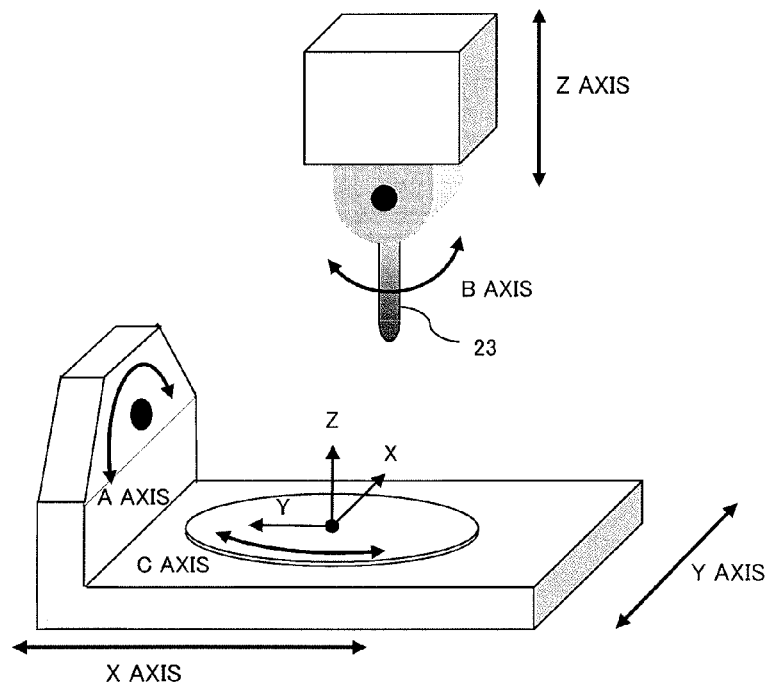
FIG. 3 is a schematic view illustrating a machine configuration of a mixed type multi-axis machine tool having two rotating axes for rotating the table and one rotating axis for rotating the head.
Figure 4:
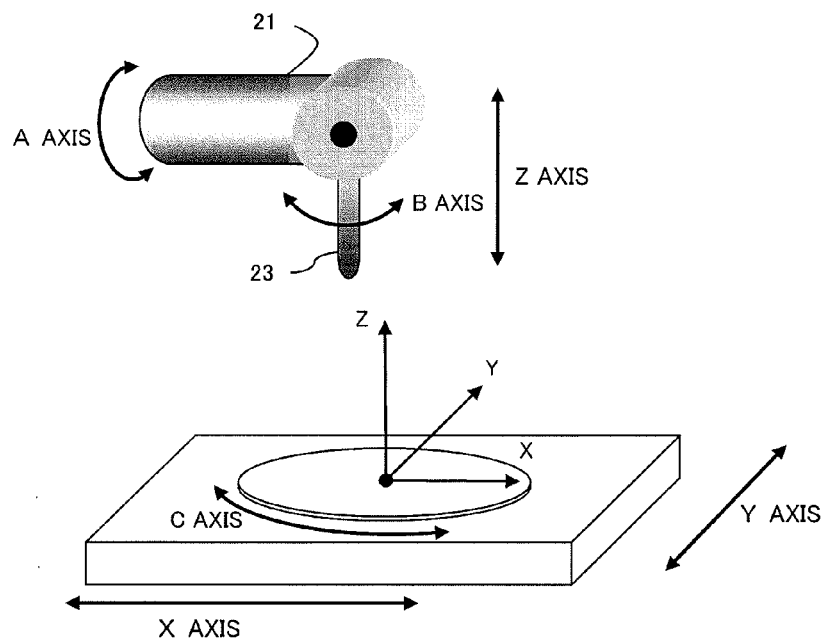
FIG. 4 is a schematic view illustrating a machine configuration of a mixed type multi-axis machine tool having one rotating axis for rotating the table and two rotating axes for rotating the head.

Described below is workpiece setting error compensation in a mixed type multi-axis machine tool having two rotating axes for rotating the table and one rotating axis for rotating the head (see FIG. 3).

Since the rotating axes are arranged in the order of B, A, and C axes from the tool to the workpiece, equation (1) above is the same as in the first embodiment (equation (5) is also the same). In addition, since the two rotating axes for rotating the table are A and C axes, equation (17) below is used instead of equation (2) above and equation (18) below is used instead of equation (13) above.

$$\begin{bmatrix} xw \\ yw \\ zw \end{bmatrix} = \begin{bmatrix} \cos Cc & -\sin Cc & 0 \\ \sin Cc & \cos Cc & 0 \\ 0 & 0 & 1 \end{bmatrix} \begin{bmatrix} 1 & 0 & 0 \\ 0 & \cos Ac & -\sin Ac \\ 0 & \sin Ac & \cos Ac \end{bmatrix} \begin{bmatrix} Xc - x0 \\ Yc - y0 \\ Zc - z0 \end{bmatrix} \quad (17)$$

$$\begin{bmatrix} x \\ y \\ z \end{bmatrix} = \begin{bmatrix} 1 & 0 & 0 \\ 0 & \cos a & \sin a \\ 0 & -\sin a & \cos a \end{bmatrix} \begin{bmatrix} \cos c & \sin c & 0 \\ -\sin c & \cos c & 0 \\ 0 & 0 & 1 \end{bmatrix} \begin{bmatrix} xa \\ ya \\ za \end{bmatrix} + \begin{bmatrix} x0 \\ y0 \\ z0 \end{bmatrix} \quad (18)$$

The subsequent calculations are the same as in the first embodiment described above and therefore description thereof will be omitted.

Fourth Embodiment

Figure 5:
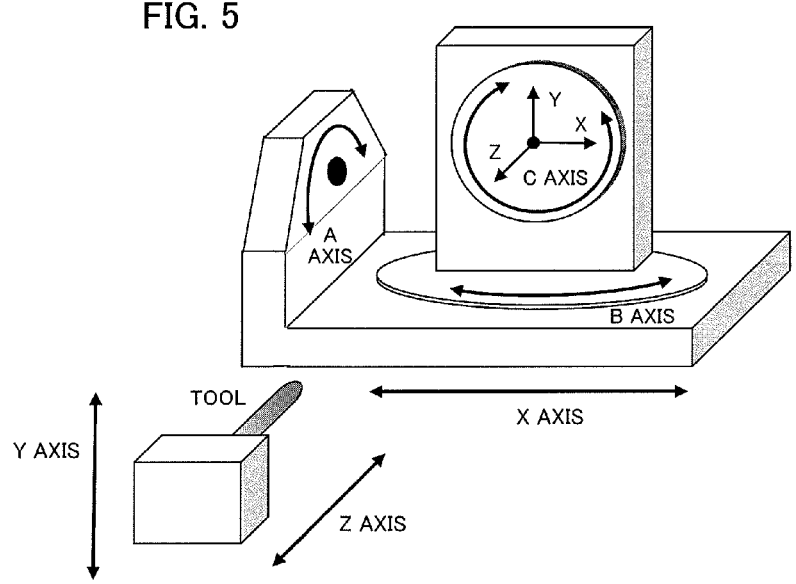
FIG. 5 is a schematic view illustrating a machine configuration of a table rotation type multi-axis machine tool having three rotating axes for rotating the table.

Described below is workpiece setting error compensation in a table rotation type multi-axis machine tool having three rotating axes for rotating the table (see FIG. 5).

Since the rotating axes are arranged in the order of A, B, and C axes from the tool to the workpiece, equation (14) above is used instead of equation (1) above (furthermore, instead of equation (5) above), as in the second embodiment described above. In addition, since the table rotating axes are A, B, and C axes, equation (19) below is used instead of equation (2) above, and equation (20) below is used instead of equation (13) above.

$$\begin{bmatrix} xw \\ yw \\ zw \end{bmatrix} = \begin{bmatrix} \cos Cc & -\sin Cc & 0 \\ \sin Cc & \cos Cc & 0 \\ 0 & 0 & 1 \end{bmatrix} \begin{bmatrix} \cos Bc & 0 & \sin Bc \\ 0 & 1 & 0 \\ -\sin Bc & 0 & \cos Bc \end{bmatrix} \quad (19)$$

$$\begin{bmatrix} 1 & 0 & 0 \\ 0 & \cos Ac & -\sin Ac \\ 0 & \sin Ac & \cos Ac \end{bmatrix} \begin{bmatrix} Xc - x0 \\ Yc - y0 \\ Zc - z0 \end{bmatrix}$$

$$\begin{bmatrix} x \\ y \\ z \end{bmatrix} = \begin{bmatrix} 1 & 0 & 0 \\ 0 & \cos a & \sin a \\ 0 & -\sin a & \cos a \end{bmatrix} \begin{bmatrix} \cos b & 0 & -\sin b \\ 0 & 1 & 0 \\ \sin b & 0 & \cos b \end{bmatrix} \begin{bmatrix} \cos c & \sin c & 0 \\ -\sin c & \cos c & 0 \\ 0 & 0 & 1 \end{bmatrix} \quad (20)$$

$$\begin{bmatrix} xa \\ ya \\ za \end{bmatrix} + \begin{bmatrix} x0 \\ y0 \\ z0 \end{bmatrix}$$

The subsequent calculations are the same as in the first embodiment described above and therefore description thereof will be omitted.

Figure 9:
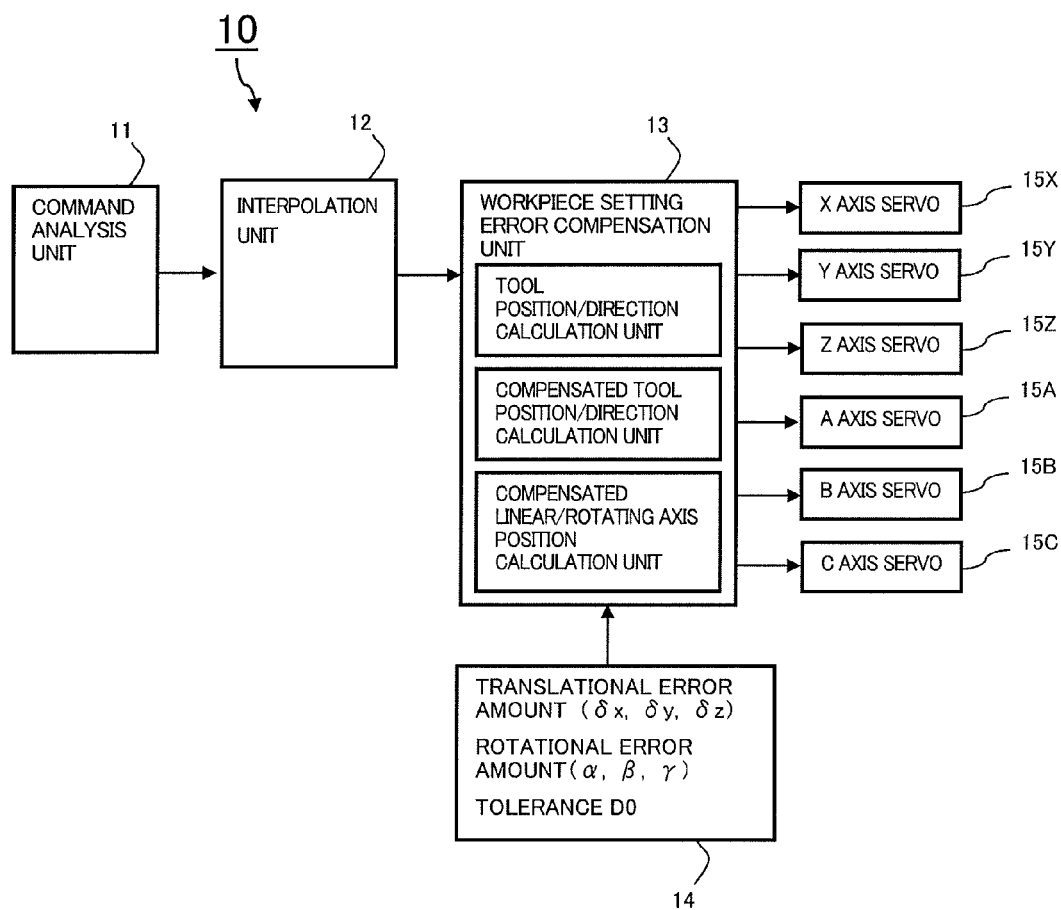
FIG. 9 is a block diagram illustrating a numerical controller for multi-axis machine tool including a workpiece setting error compensation unit according to the present invention.

Referring now to FIG. 9, a numerical controller for multi-axis machine tool including a workpiece setting error compensation unit according to the present invention will be described.

A numerical controller 10 typically analyzes program commands in a command analysis unit 11, creates interpolated axis positions by interpolating the axis positions in an interpolation unit 12 on the basis of the results of the analysis, and drives the servos associated with the axes on the basis of the interpolated axis positions. In the present invention, the workpiece setting error compensation unit 13 determines the compensated linear axis positions of the three linear axes and the compensated rotating axis positions of the three rotating axes by performing workpiece setting error compensation calculations using the interpolated axis positions as the commanded positions and using the setting error amounts (translational error amounts ($\delta x$, $\delta y$, $\delta z$) and rotational error amounts ($\alpha$, $\beta$, $\gamma$)) stored in a setting error amount and tolerance amount storage unit 14. The axes are then driven on the basis of the compensated linear axis positions of the three linear axes and the compensated rotating axis positions of the three rotating axes.

The workpiece setting error compensation unit 13 has a tool position/direction calculation unit for calculating the tool position and direction on the workpiece setting coordinate system, a compensated tool position/direction calculation unit for calculating compensated tool position and direction on the basis of the setting error amounts with respect to the tool position and direction thus calculated, and a compensated linear/rotating axis position calculation unit for calculating compensated linear axis positions of the three linear axes and compensated rotating axis positions of the three rotating axes for the compensated tool position and direction thus calculated. The compensated linear/rotating axis position calculation unit refers to the setting error amounts and the tolerance D0 stored in the tolerance amount storage unit 14.

Figure 10:
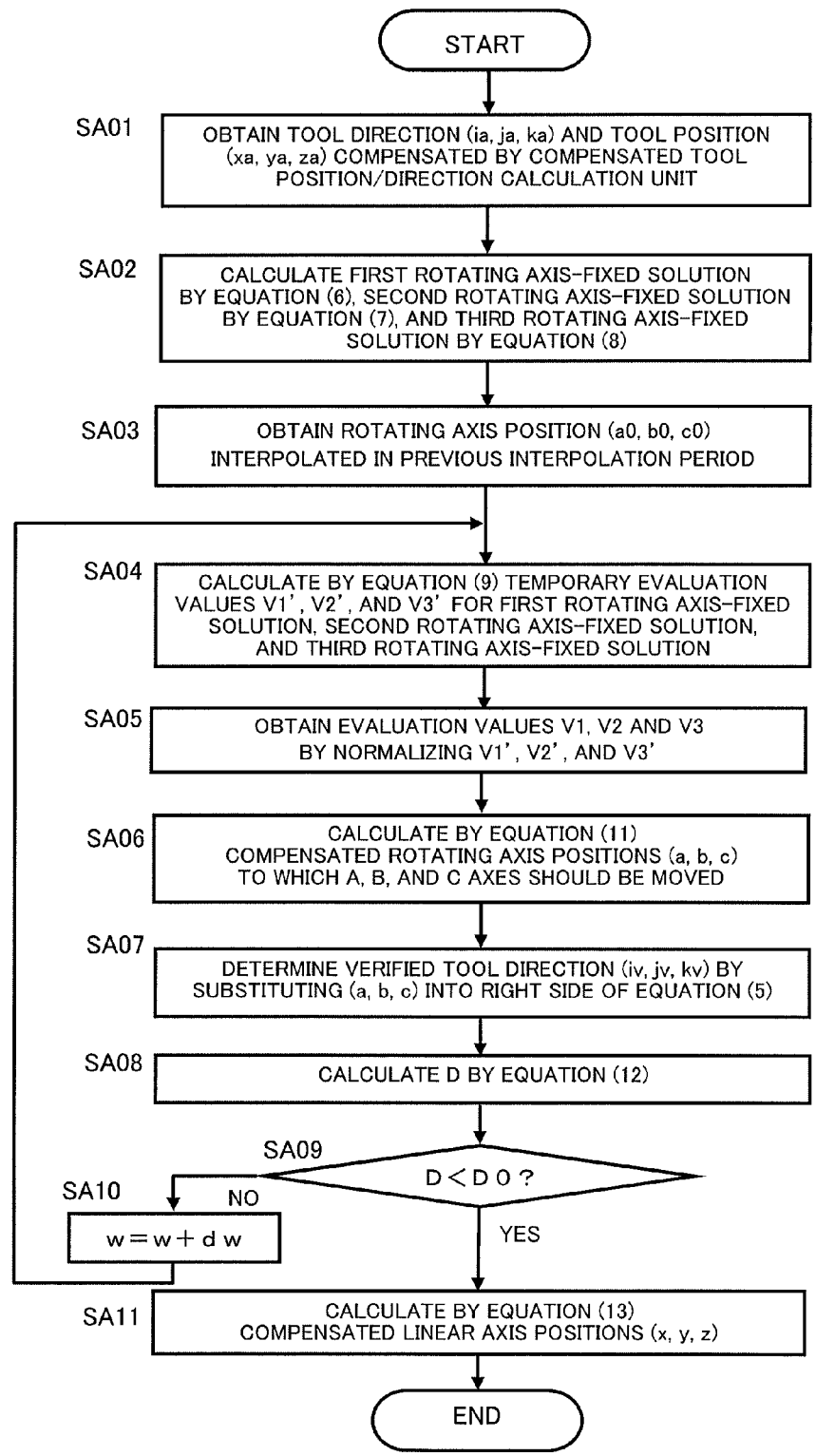
FIG. 10 is a flowchart illustrating a processing algorithm executed by a compensated linear/rotating axis position calculation unit in the workpiece setting error compensation unit (first embodiment) of the numerical controller for multi-axis machine tool according to the present invention.

FIG. 10 is a flowchart illustrating a processing algorithm executed by the compensated linear/rotating axis position calculation unit in the first embodiment of the workpiece setting error compensation unit in the numerical controller according to the present invention for a multi-axis machine tool.

[Step SA01] A compensated tool direction (ia, ja, ka) and a compensated tool position (xa, ya, za) are calculated in the compensated tool position/direction calculation unit in the workpiece setting error compensation unit 13.

[Step SA02] A first rotating axis-fixed solution is calculated by equation (6), a second rotating axis-fixed solution is calculated by equation (7), and a third rotating axis-fixed solution is calculated by equation (8).

[Step SA03] Rotating axis positions (a0, b0, c0) interpolated in the previous interpolation period is obtained.

[Step SA04] Temporary evaluation values V1', V2' and V3' for the first, second and third rotating axis-fixed solutions are calculated by equation (9), respectively.

[Step SA05] Evaluation values V1, V2 and V3 are obtained by normalizing the temporary evaluation values V1', V2' and V3' calculated in Step SA04.

[Step SA06] Compensated rotating axis positions (a, b, c) to which the A, B and C axes are to be moved are calculated by equation (11).

[Step SA07] A verified tool direction (iv, jv, kv) is determined by substituting the compensated rotating axis positions (a, b, c) calculated in Step SA06 into the right side of equation (5).

[Step SA08] D is calculated by equation (12).

[Step SA09] It is determined whether D calculated in Step SA08 is smaller than a preset tolerance D0 or not; if smaller (when YES), the process proceeds to Step SA11; if not (when NO), the process proceeds to Step SA10.

[Step SA10] An exponent value 'w' is updated by adding a constant value 'dw' to 'w' and the process returns to Step SA04 to continue this process.

[Step SA11] Compensated linear axis positions (x, y, z) is calculated by equation (13) and the process is finished.

Figure 11:
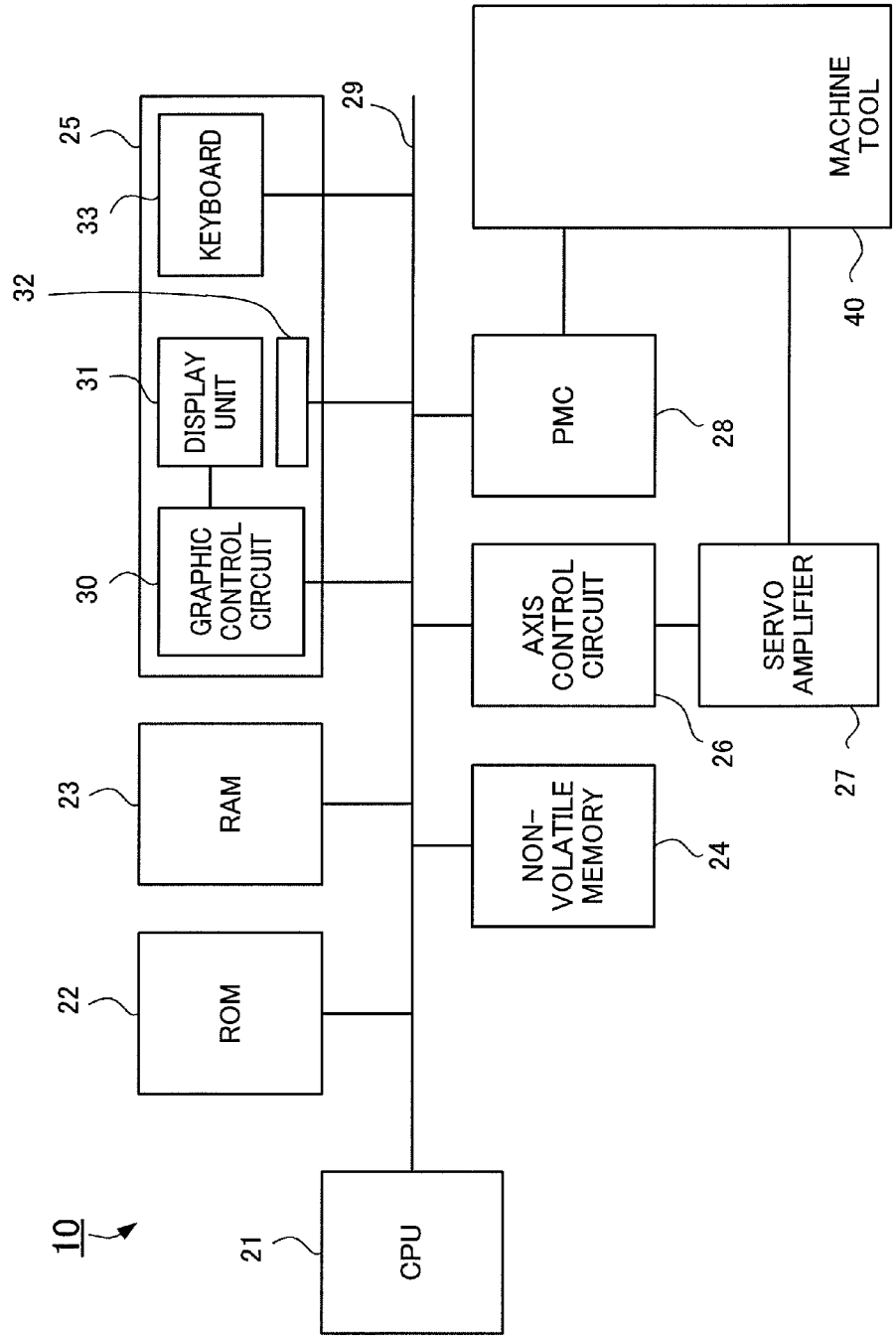
FIG. 11 illustrates the hardware configuration of the numerical controller for multi-axis machine tool including a workpiece setting error compensation unit (first embodiment) according to the present invention.

Referring now to FIG. 11, the hardware configuration of the numerical controller for multi-axis machine tool having a workpiece setting error compensation unit according to the present invention will be described.

A processor CPU 21 globally controls a numerical controller 10 according to a system program stored in ROM 22. The command analysis unit 11 and interpolation unit 12 in FIG. 9 are software functions executed by CPU 21 according to the system program in ROM 22. Similarly, the workpiece setting error compensation unit 13 in FIG. 9 is a software function. Temporary data such as input/output signals are stored in RAM 23. A non-volatile memory 24 stores the parameters and machining programs that are to be retained even if power is shut down.

A display unit/MDI panel 25 is equipped with a graphic control circuit 30, display unit 31, software keys 32 having functions varying with a system program, etc., and a keyboard 33. The graphic control circuit 30 converts guidance information, specified shapes that are input, etc., to displayable signals and outputs these signals to the display unit 31. A liquid crystal display device is used as the display unit 31.

The axis control circuit 26 receives from CPU (processor) 21 axis motion commands including interpolation pulses CP and outputs the axis motion commands to a servo amplifier 27 to control the servo amplifier 27. In response to these motion commands, the servo amplifier 27 drives servo motors (not shown) for driving the axes in the machine tool 40. These components are interconnected via a bus 29. When a machining program is executed, PMC (programmable machine controller) 28 receives signals including a T function signal (tool selection command) via the bus 29. PMC 28 processes these signals according to a sequence program and outputs signals as motion commands to control the machine tool 40.

The invention claimed is:

1. A numerical controller for controlling a multi-axis machine tool having at least three linear axes and three rotating axes for machining a workpiece attached to a table,
wherein the numerical controller comprises a workpiece setting error compensation unit for compensating a setting error that arises when the workpiece is set, the workpiece setting error compensation unit including:
a tool position/direction calculation unit for calculating tool position and direction on a workpiece setting coordinate system on the basis of commanded positions of the three linear axes and three rotating axes, wherein the workpiece setting coordinate system is the coordinate system on which the workpiece is set;
a compensated tool position/direction calculation unit for calculating compensated tool position and direction on the basis of the setting error amounts that are set in advance depending on the setting error, such that tool position and direction on the workpiece setting coordinate system calculated by the tool position/direction calculation unit are maintained on the workpiece having the setting error, and
a compensated linear/rotating axis position calculation unit for calculating compensated linear axis positions of the three linear axes and compensated rotating axis positions of the three rotating axes from the compensated tool position and direction calculated in the compensated tool position/direction calculation unit;
wherein the three linear axes and three rotating axes are driven on the basis of the compensated linear axis positions of the three linear axes and compensated rotating axis positions of the three rotating axes calculated by the compensated linear/rotating axis position calculation unit,
wherein the compensated linear/rotating axis position calculation unit determines the compensated rotating axis positions by calculating multiple solutions for the three rotating axes from the compensated to direction calculated by the compensated tool position/direction calculation unit and synthesizing the calculated multiple solutions.

2. The numerical controller according to claim 1, wherein the compensated linear/rotating axis position calculation unit determines the compensated linear axis positions by multiplying the compensated tool position calculated by the compensated tool position/direction calculation unit by an inverse transformation matrix with the compensated table rotating axis positions out of the compensated rotating axis positions.

3. The numerical controller according to claim 1, wherein the multiple solutions include a first rotating axis-fixed solution assuming that, of the three rotating axes, a first rotating axis does not move, a second rotating axis-fixed solution assuming that a second rotating axis does not move, and a third rotating axis-fixed solution assuming that a third rotating axis does not move.

4. The numerical controller according to claim 1, wherein the multiple solutions include a first rotating axis-fixed solution assuming that, of the three rotating axes, a first rotating axis moves through a first rotating axis motion amount determined in a previous interpolation period, a second rotating axis-fixed solution assuming that a second rotating axis moves through a second rotating axis motion amount determined in the previous interpolation period, and a third rotating axis-fixed solution assuming that a third rotating axis moves through a third rotating axis motion amount determined in the previous interpolation period.

5. The numerical controller according to claim 1, wherein the compensated linear/rotating axis position calculation unit determines the compensated rotating axis positions by calculating, for the multiple solutions, evaluation values highly evaluating a smaller motion amount and multiplying motion amounts given by the multiple solutions by the calculated evaluation values and synthesizing the multiplied motion amounts.

6. The numerical controller according to claim 5, wherein the compensated linear/rotating axis position calculation unit determines compensated rotating axis positions by determining a verified tool direction from the compensated rotating axis positions of the three rotating axes determined by the compensated linear/rotating axis position calculation unit, verifying whether a difference between the determined verified tool direction and the compensated tool direction calculated by the compensated tool position/direction calculation unit is within a preset tolerance or not, and, if not within the tolerance, determining an evaluation value highly evaluating a smaller motion amount to repeat the compensated rotating axis position calculation.

7. The numerical controller according to claim 1, wherein the multi-axis machine tool is a multi-axis machine tool including three rotating axes for rotating a tool head.

8. The numerical controller according to claim 1, wherein the multi-axis machine tool is a multi-axis machine tool having three rotating axes including two rotating axes for rotating a table and one rotating axis for rotating a tool head.

9. The numerical controller according to claim 1, wherein the multi-axis machine tool is a multi-axis machine tool having three rotating axes including two rotating axes for rotating a tool head and one rotating axis for rotating a table.

10. The numerical controller according to claim 1, wherein the multi-axis machine tool is a multi-axis machine tool having three rotating axes for rotating a table.

* * * * *